July 28, 1925. 1,547,401
J. PATTERSON
TRANSMISSION
Filed April 29, 1924 6 Sheets-Sheet 1
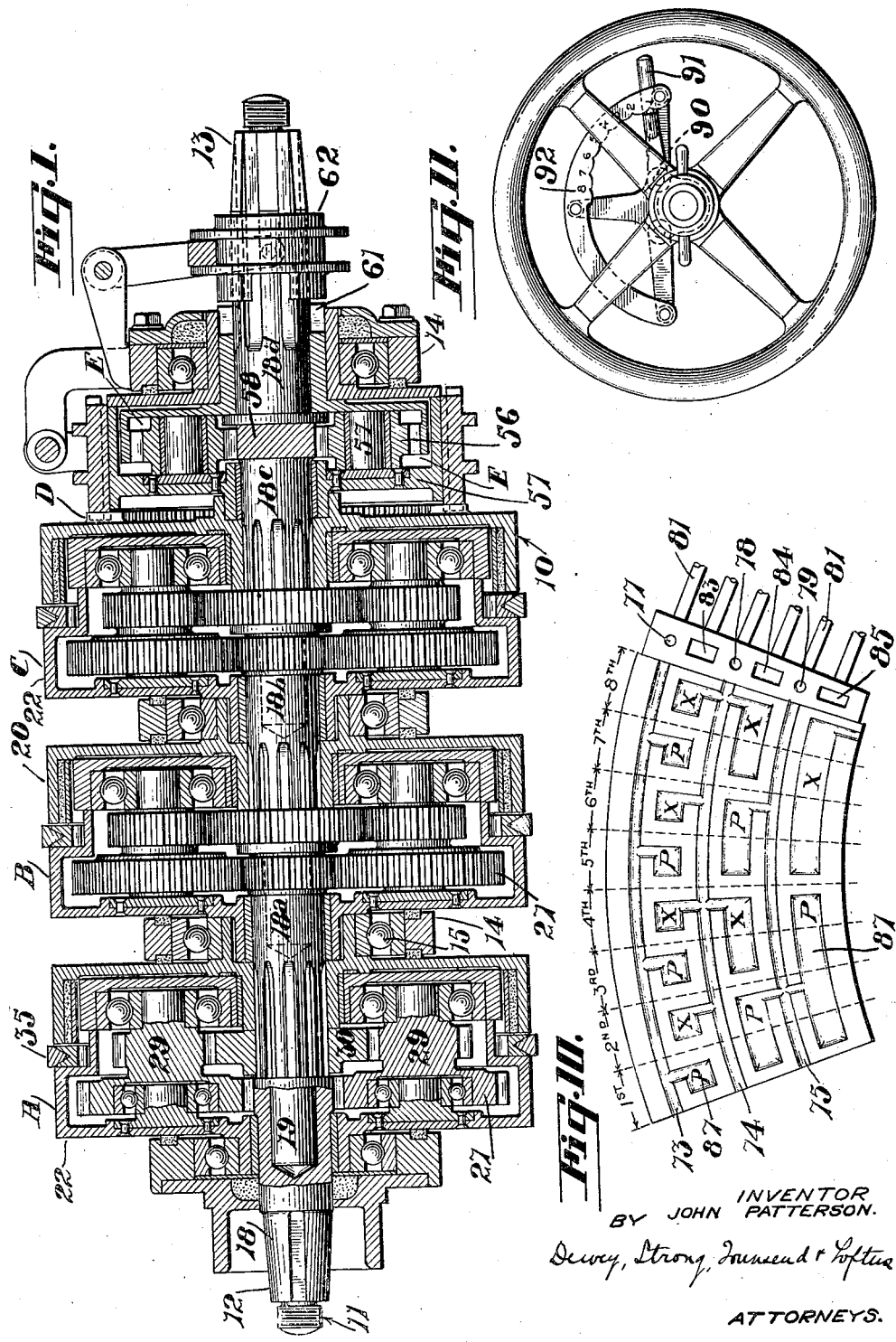
INVENTOR
BY JOHN PATTERSON.
Dewey, Strong, Townsend & Loftus
ATTORNEYS.

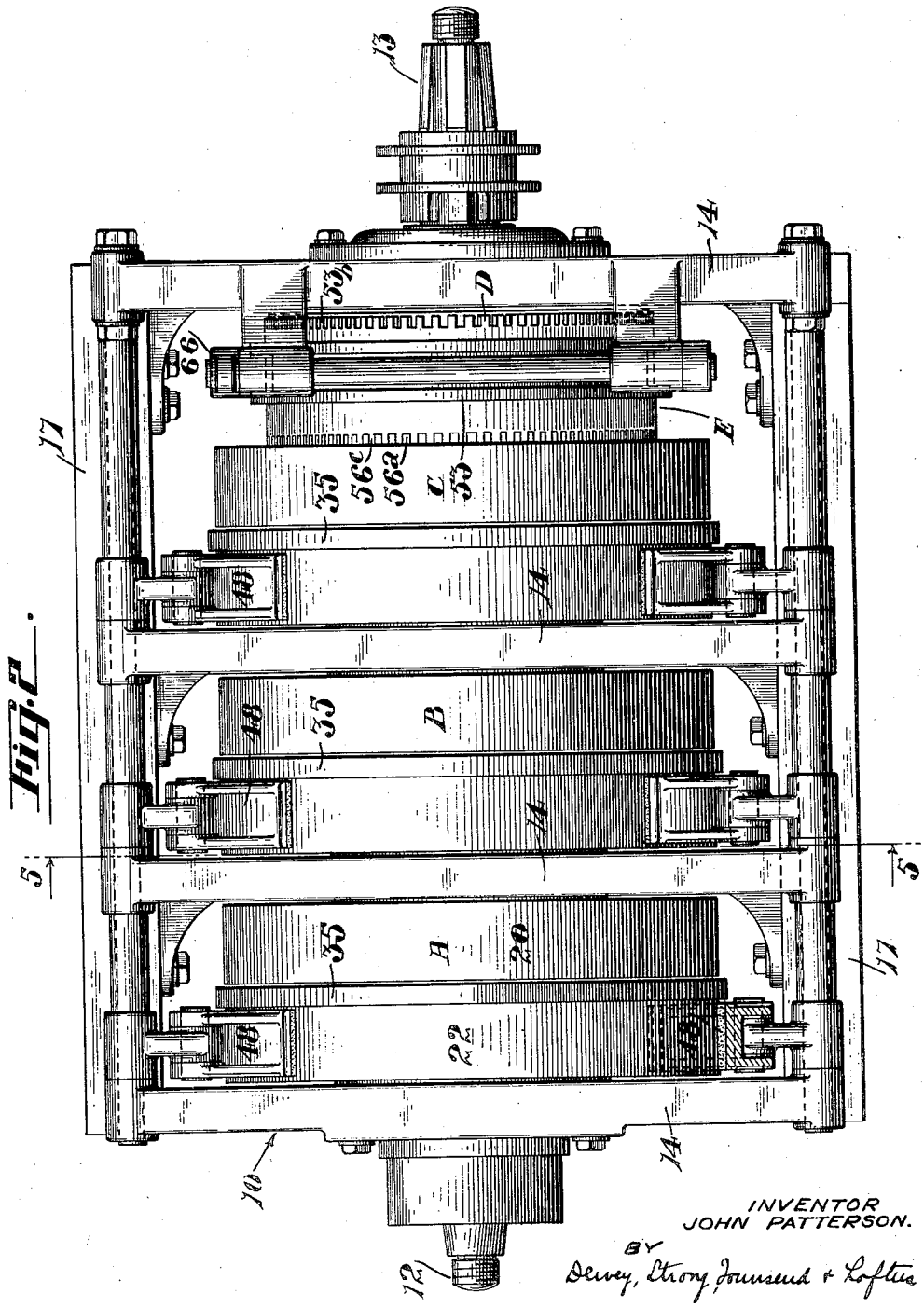

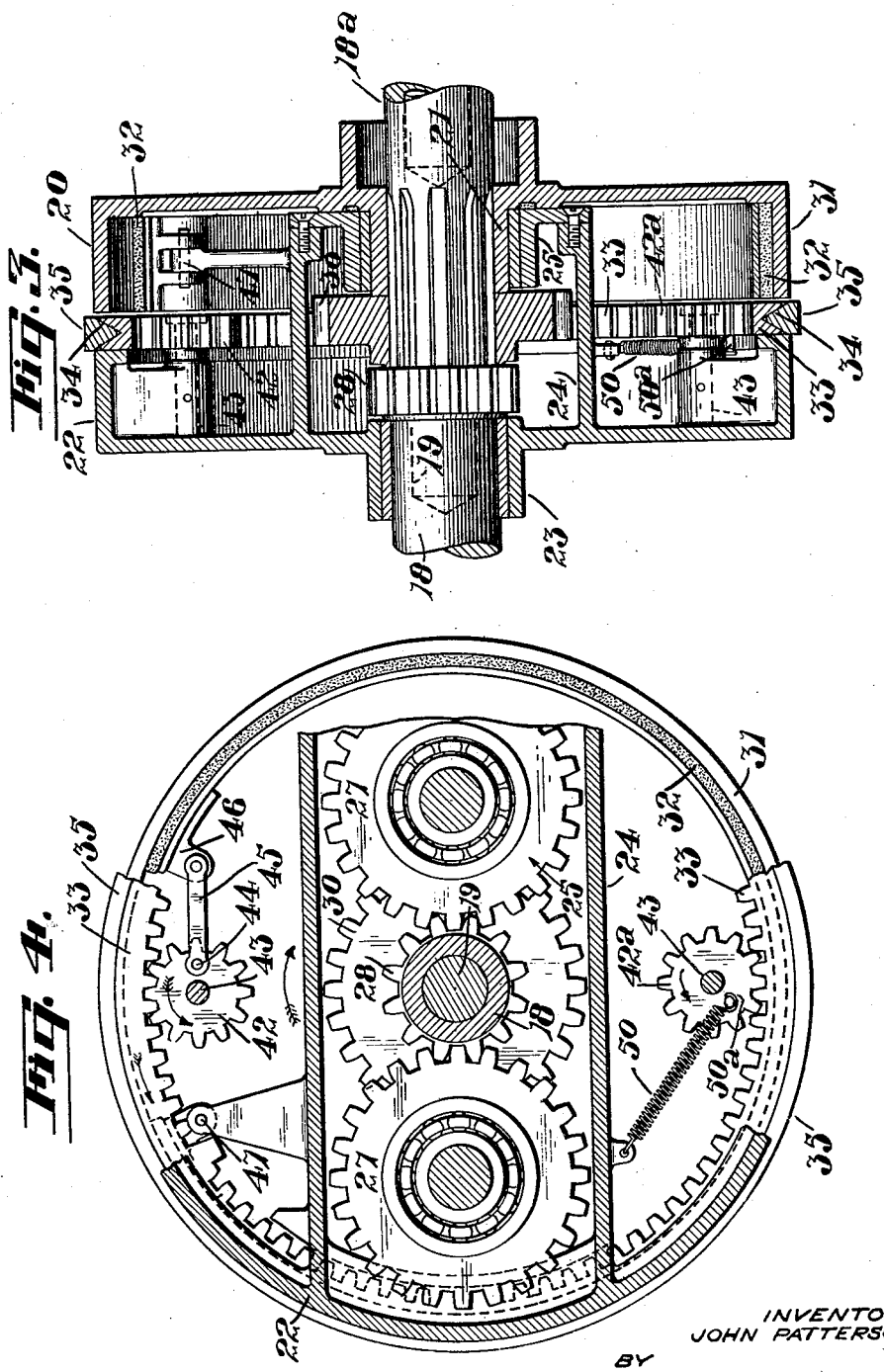

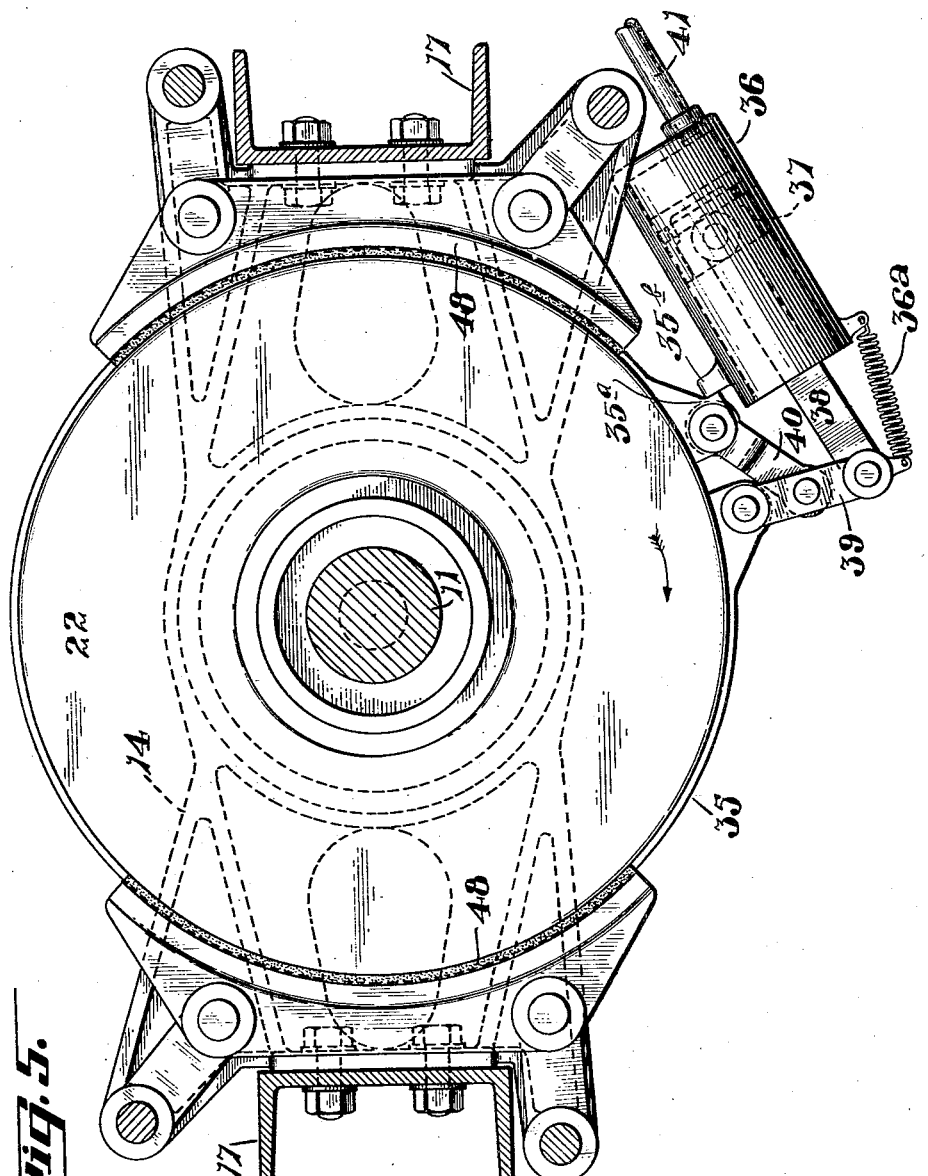

July 28, 1925. 1,547,401
J. PATTERSON
TRANSMISSION
Filed April 29, 1924 6 Sheets-Sheet 5
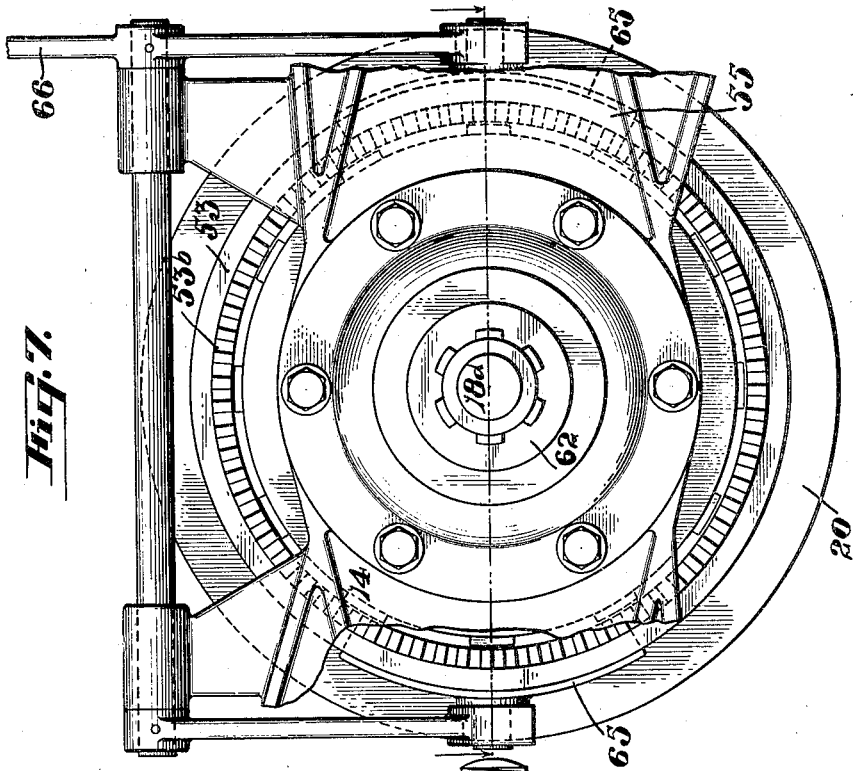
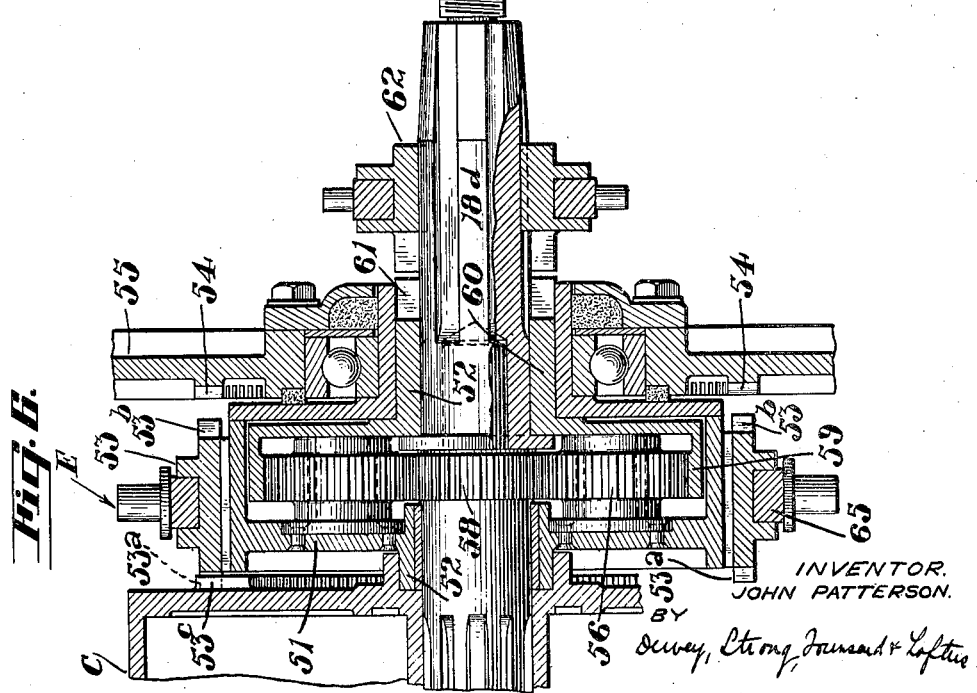
INVENTOR.
JOHN PATTERSON.
BY
ATTORNEYS.

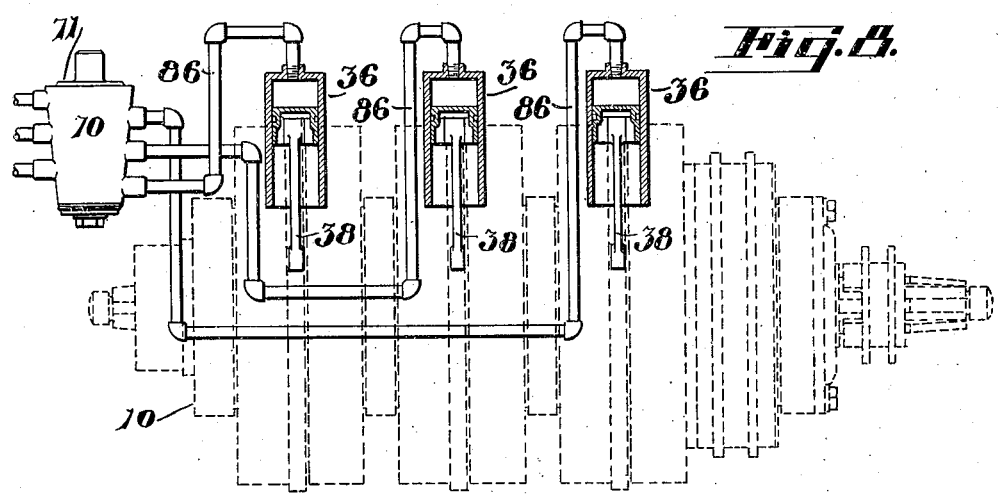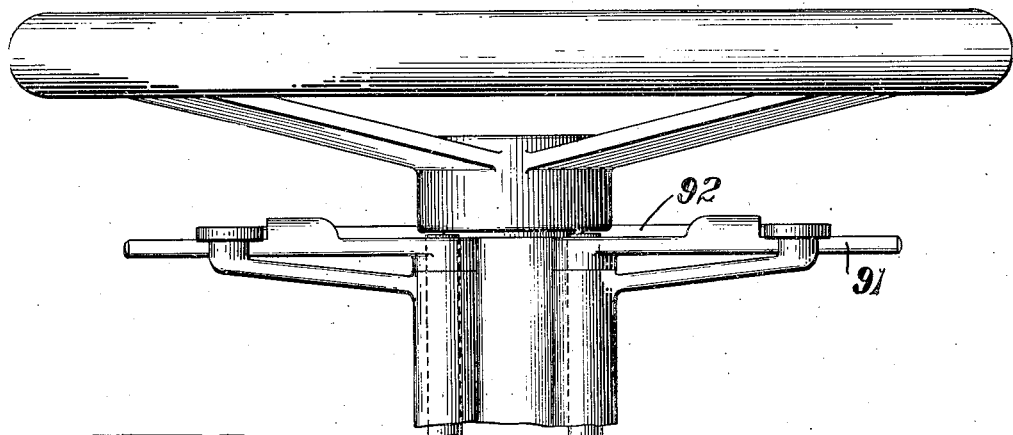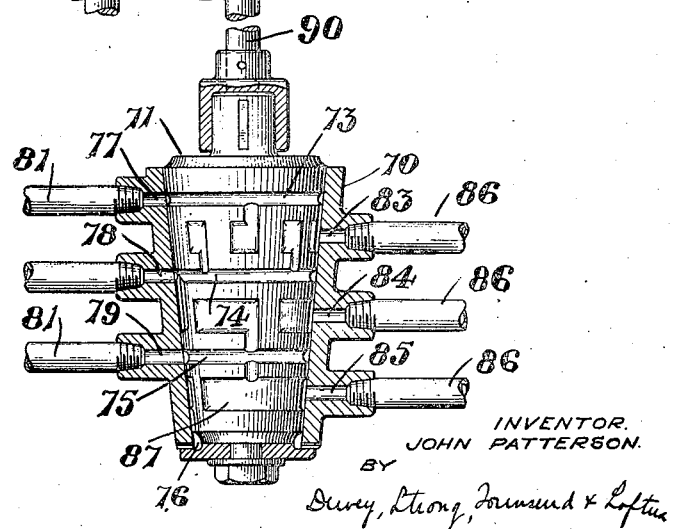

Patented July 28, 1925.

1,547,401

UNITED STATES PATENT OFFICE.

JOHN PATTERSON, OF OAKLAND, CALIFORNIA, ASSIGNOR TO JOHN PATTERSON INVENTIONS, INC., OF RENO, NEVADA, A CORPORATION OF NEVADA.

TRANSMISSION.

Application filed April 29, 1924. Serial No. 709,780.

*To all whom it may concern:*

Be it known that I, JOHN PATTERSON, a citizen of the United States, residing at Oakland, county of Alameda, and State of California, have invented new and useful Improvements in Transmissions, of which the following is a specification.

This invention relates to variable speed transmission, and particularly pertains to the type of transmission wherein the gears are in constant mesh and may be selectively placed in operation to produce different speed ratios between the driving motor and the propeller shaft of the vehicle.

It is the principal object of the present invention to generally improve transmissions of the type referred to whereby to provide a transmission embodying the use of improved mechanism for producing different speed ratios between the driving and driven shafts with which the transmission is associated, which mechanism may be selectively operated to produce changes in speed ratios without interrupting the driving connection between the said driving and driven shafts.

In carrying out this object I provide a plurality of reduction units, each capable of producing either a direct or a reduction drive. The units mentioned are designed and operatively connected in a manner whereby a multiplicity of different speed ratios may be obtained between the driving and driven shafts with which the transmission is associated, without interrupting the driving connection between the driving and driven shafts by placing the reduction units in operation singly or in different combinations by means of a selective control mechanism. A clutch and a reverse gear set are associated with the reduction units for cooperation therewith.

One form which the invention may assume is exemplified in the following description and illustrated by way of example in the accompanying drawings, in which:

Fig. 1 is a vertical section taken longitudinally through a transmission embodying the preferred form of my invention.

Fig. 2 is a view in side elevation of the transmission.

Fig. 3 is an enlarged view in section taken through one of the reduction units.

Fig. 4 is an end elevation of the reduction unit shown in the preceding figure and with parts broken away to more clearly illustrate certain of the operating parts.

Fig. 5 is a transverse section through the transmission taken on line 5—5 of Fig. 2 and with parts broken away to disclose certain elements which are associated with the drum of each unit.

Fig. 6 is an enlarged plan section taken through the main clutch and reverse gear set.

Fig. 7 is an end view of the transmission showing the mechanism for operating the clutch.

Fig. 8 is a diagrammatic view of the fluid pressure control system employed for controlling the operation of the reduction units.

Fig. 9 is a vertical section through the control mechanism used in connection with the system for controlling the reduction units.

Fig. 10 is a schematic view disclosing the developed face of the control valve and the position of the ports in the valve casing and their relation to the control valve.

Fig. 11 is a plan view of the quadrant and quadrant lever for operating the valve of the control system.

Referring more particularly to the accompanying drawings, 10 indicates a transmission embodying my invention, and of a design suitable for automotive use.

In general, referring to Fig. 1, the structure comprises a built-up shaft 11, the end 12 of which is adapted to connect to the motor. The other end which is indicated at 13 may be connected with the propeller shaft of the vehicle.

Mounted on the shaft mentioned are three reduction units which are indicated at A, B, and C, a main clutch D and a planetary reverse gear set indicated at E.

At each end of the transmission and between the reduction units I arrange transverse frames 14. These frames are provided with bearings 15 in which telescoping hubs 16 of the various units are journalled. The ends of the transverse frames are suitably bolted to longitudinally arranged frame members 17 which are disposed one at each side of the transmission as shown in Fig. 5.

The shaft of the transmission illustrated in the accompanying drawings is built up of sections 18, 18ª, 18ᵇ, 18ᶜ and 18ᵈ. The section 18 is the driving end and the section 18ᵈ is the driven end. Each of the sections intermediate the end sections is formed with a spindle 19 which is journalled in a bore formed in the end of the adjacent section.

The various sections are free to rotate independently of each other and are operatively connected through the various operating units, A, B and C, to transmit rotation applied from the driving section to the driven section at speed ratios, depending upon which unit, A, B, and C, or combination thereof, is placed in operation. The main clutch D when disengaged will interrupt the driving connection between the driven end section and the remaining ones.

Reference being had to Figs. 3 and 4 where the reduction unit A is most clearly illustrated it is seen that it comprises a flywheel 20 having a hub 21, which is keyed on the driven section 18ª of the shaft. Mounted on the driving section 18 of the shaft for co-operation with the flywheel is a drum 22 having a hub 23 which is freely rotatable on the driving shaft. The drum 22 is formed with a housing 24, which extends diametrically across the drum and is formed with a bearing sleeve 25 which is journalled on the hub 21 of the flywheel. The housing 24 constitutes an enclosure for a pair of compound gears, each of which comprises a gear 27 which is in constant mesh with a pinion 28 formed on the driving section 18 of the shaft, and a pinion 29 which is in constant mesh with a gear 30 which is keyed to the driven section 18ª of the shaft.

The compound gears are mounted in bearings which are located on opposite sides of the center of the drum, whereby centrifugal balance is obtained and the bearings carrying the driving and driven sections of the shafts are relieved of direct tangential load.

When power is transmitted to the driving section 18 of the shaft and the drum is held from rotation the driving section 18 of the shaft will drive the driven section 18ª of the shaft at a slower rate of speed through the medium of the compound gears described. That is, rotation of the driving section 18 of the shaft will revolve the gears 27 through the medium of the pinion 28 causing the pinions 25 to rotate the driven section 18ª of the shaft through the gear 30.

Means are provided to connect the flywheel and drum whereby they will rotate in unison and through the medium of the compound gears and the pinion and gear on the driving and driven shafts respectively, provide a direct driving connection between the driving and driven shafts so that the latter will operate at engine speed. As the gear 30 on the driven shaft is fixed relatively to the fly-wheel and rotates in unison therewith, it is obvious that when the fly-wheel and drum are connected, relative rotation of the compound gears with respect to the pinion 28 and gear 30 on the driving and driven sections 18 and 18ª of the shaft will be prevented, and that the compound gears 25 will revolve about the common axis of the driving and driven sections of the shaft and a direct driving connection between the driving and driven sections will thereby be established. The means mentioned includes a peripheral rim 31 on the flywheel within which I arrange an internal brake-band 32 which is carried by the drum. Normally this brake-band is in firm frictional engagement with the rim of the fly-wheel and constitutes a connection between the fly-wheel and drum so that they will revolve in unison to establish a direct driving connection between the shafts as described.

For controlling the operation of the brake band 32 I provide a ring gear 33 which is interposed between the rims of the fly wheel and the drum. This ring gear is formed with internal gear teeth and its exterior face is formed with a circumscribing V-shaped groove 34 which is adapted to receive a wedge-like split clamping ring 35. The mounting of the clamping ring 35 is most clearly illustrated in Fig. 5.

For operating the clamping ring 35 I provide a control cylinder 36 which is fitted with a reciprocal piston 37. The connecting rod 38 of this piston connects to one end of a link 39. The other end of this link connects to one end of the split clamping ring 35. The other end of the clamping ring is connected to a link 40 which is connected to the link 39 at a point intermediate the ends of the latter. The arrangement of the links described is such that when fluid under pressure is admitted to the end of the control cylinder through a pipe 41 to force the piston in the cylinder outwardly, the clamping ring will be contracted and will tightly grip the ring gear 33 and prevent it from rotating. When the pressure in the cylinder is relieved a tension spring 36ª will cause the clamping ring to expand and assume its normal position and thereby release its grip on the ring gear.

The mechanism for operating the brake band 32 is most clearly illustrated in Figs. 3 and 4 and comprises pinions 42 and 42ª which are fixed on shafts 43 carried by the drum. The pinions 42 and 42ª are in constant mesh with the ring gear 33 and serve as supports for the latter. Fixed on the shaft of the pinion 42 is a crank arm 44 which is connected by a link 45 to the free end 46 of the brake band 32. The other end of the brake band is fixed to the drum 22 as at 47.

When the drive shaft is in operation and it is desired to disconnect the fly-wheel from the drum and permit the driving shaft to drive the driven shaft through the medium of the gears as described, fluid under pressure is admitted to the cylinder 36 to force the piston 37 therein outwardly. The connection between the piston 37 and the ends of the clamping ring 35 will then operate to contract the clamping ring 35 and thereby stop the rotation of the ring gear 33. The drum 22 will then advanced slightly with respect to the ring gear and cause rotation of the pinions 42 and 42ᵃ in the direction of the arrows in Fig. 4. Rotation of the pinion 42 in this direction will swing the crank pin 44 and through the link 45 will contract the brake band 32 and release the same from engagement with the fly wheel.

When the connection between the flywheel and drum has been released, the tendency of the drum is to rotate in a direction counter to that of the fly-wheel. This is due to the action of the compound gears, which immediately become in operation when the two parts are disconnected. To prevent this counter rotation I provide a pair of external brake shoes 48 which are supported by the frame of the transmission. These brake shoes are disposed one at each side of the transmission and are adapted to engage the outer peripheral surface of the rim of the drum 22. The brake shoes are connected by links 49 to the frame of the transmission in a manner whereby when the drum 22 commences to rotate in a direction counter to the direction of the flywheel, the brake shoes 48 will wedge into firm frictional engagement with the rim of the drum and thus hold the latter from rotation. The driving shaft will then drive the driven shaft at a reduced rate of speed through the medium of the compound gears and the pinion and gear on the driving and driven shafts respectively. The brake shoes 48 will automatically disengage from the drum 22 when the latter commences rotation in a direction parallel to the flywheel 20.

To insure that the brake band 32 will be fully released from engagement with the rim of the fly-wheel, the stroke of the piston 37 in the cylinder 36 is of a length greater than that necessary to fully contract the clamping ring 35 to prevent rotation of the ring gear 33. Therefore, at the end of the outward stroke of the piston 37 the ring gear 33 will be moved circumferentially in the direction of the arrow shown in Fig. 4. It should be understood that before the clamping ring 35 is fully contracted, the rotation of the ring gear 33 will be retarded and allow slippage between the brake band 32 and the rim of the flywheel. When this occurs the rotation of the drum is retarded due to the action of the compound gears. This prevents complete correct amount of relative movement between the drum and the grooved band 33 and prevents full releasing of the brake band 32. Therefore, when rotation of the drum in a direction the same as the flywheel ceases and the drum tends to rotate in a counter direction as described, the brake shoes 48 operate to hold the drum 22 against rotation. At this period the stroke of the piston 37 in the cylinder 36 is just being completed and as the clamping ring 35 is fully contracted on the ring gear 33, they will move circumferentially in the direction of the arrow in Fig. 4 and relatively to the drum 22.

Such rotation of the ring gear will further revolve the pinions 42 and 42ᵃ and through the medium of the crank arm 44 and the link 45, further contract the brake band and fully release it from the flywheel.

When it is desired to re-establish a direct driving connection between the flywheel and drum, the pressure in the control cylinder is relieved to permit the spring 36ᵃ to expand the clamping ring 35. Immediately this ring is expanded, the ring gear 33 will be released and will be returned to normal position relatively to the drum by means of a tension spring 50. One end of this tension spring is connected to a pin 50ᵃ which is fixed eccentrically on the pinion 42ᵃ. The other end of the spring is connected to the drum and when the ring gear is released by the ring 35, the spring 50 will cause rotation of the pinion 42ᵃ and consequently revolve the ring gear. Such movement of the ring gear will revolve the pinion 42 in a direction causing the latter, through the crank arm 44 and the link 45, to expand the brake band 32 and thereby re-establish a driving connection between the drum and the flywheel.

The main clutch D and the planetary reverse set E are most clearly illustrated in Figs. 1 and 6 of the drawings.

The clutch comprises a two-part housing 51 which is formed with hubs 52 by which the housing is rotatably supported. Splined on the rim of this housing is a clutch member 53 which is shiftable longitudinally of the housing. The opposite faces 53ᵃ and 53ᵇ of this clutch member are formed with teeth. The toothed face 53ᵃ of the clutch member is adapted to cooperate with teeth 53ᶜ formed on the face of the flywheel 28 of the unit C. The other face 53ᵇ of the clutch member is adapted to cooperate with the toothed portions 54 on the transverse member 55 of the transmission frame.

A plurality of planet pinions 56 are journalled on stub spindles 57 which are fixed to the clutch housing 51 at equally spaced points on a circle concentric with respect to the shaft. These pinions 56 are in constant mesh with a sun gear 58 which is formed on the section 18ᶜ of the shaft. The pinions 56 are also in constant mesh with an internal gear 59, the hub 60 of which is freely rotatable on the driven section 18ᵈ of the shaft.

The hub of the internal gear 59 is formed with a jaw clutch part 61 which is adapted to cooperate with a jaw clutch part 62 which is splined on the driven section 18ᵈ of the shaft. The member 62 may be shifted on the shaft to form a locking engagement between the internal gear 59 and the shaft section 18ᵈ.

When the clutch member is in engagement with the teeth on the flywheel of the reduction unit C, the clutch housing, the section 18ᶜ of the shaft, and the internal gear 59 will rotate in unison and relative movement between the planet pinions 56 and the sun gear 68 will be prevented. Therefore, when the clutch parts 61 and 62 are engaged, the driven end section of the shaft will be revolved at the same rate of speed as the flywheel unit C. A forward drive will thus be transmitted to the driven section 18ᵈ of the shaft through the planet pinions, the sun gear, and the internal gear 59, when the latter is clutched to the shaft through the jaw clutch member 61.

When the clutch member is in neutral position, the sun gear will rotate the planet pinions to cause them to travel slowly around the internal gear 59 which will remain stationary.

When it is desired to drive the end section of the shaft in a reverse direction, the toothed face 53ᵇ of the clutch member is engaged with the teeth 54 on the frame member 55 of the transmission to hold the clutch member and clutch housing against rotation. This will hold the spindles of the planet pinions 56 in a stationary position. The sun gear 58 will then drive the planet pinions 56 which in turn will drive the internal gear 59 in a direction reverse to that of the sun gear. This rotation will be transmitted to the driven end section of the shaft through the clutch members 61 and 62.

The means for operating the clutch member is clearly shown in Fig. 7 and comprises a yoke 65, the ends of which are connected to the clutch member. This yoke may be operated by means of a lever 66.

In each of the reduction units A, B, and C, I obtain two different speed ratios, namely, direct drive and reduction drive. The direct drive, as described, is obtained by operatively connecting the drum and flywheel so that they will revolve in unison and drive the driven shaft at the same rate of speed as the driving shaft. In the reduction drive, the drum is held stationary and the driving section of the shaft drives the driven section of the shaft at a slower rate of speed through the medium of the compound gears, carried by the drum.

It is obvious that torque can be transferred from the driving to the driven sections of the shaft of each unit during the change from direct to reduction drive, or from reduction drive to direct drive.

This can be better realized when it is observed that the brake shoe which prevents the drum from revolving in a reverse direction, thereby reducing the reduction with the clutch 32 out of engagement, is always operative. The speed of revolution of the drive end of the shaft is added to by the application of the clutch 32 inducing the flywheel to travel at the same speed as the driven shaft.

It is obvious that the driving connection between the driving and driven sections of the shaft of each unit is not interrupted when changing from direct to reduction drive, or vice versa.

The gear set of each of the reduction units A, B and C are designed to produce different reductions of speed. For the purpose of explanation it will be assumed that when operating in reduction drive the reduction in the units is as follows:

| Unit A. | Unit B. | Unit C. |
|---|---|---|
| 3.13 to 1 | 1.755 to 1 | 1.4 to 1 |

That is, when unit A is reduction drive the driven shaft will revolve approximately three times to one revolution of the driving shaft. The same is true of units B and C with the exception that the reductions produced are different.

Therefore, by placing all three reduction units in reduction drive I obtain the greatest reduction or first speed, which reduction will be the sum of the reductions of the individual units.

The second speed is obtained by placing the unit C in direct drive and the units A and B in reduction drive. Therefore, the speed ratio between the driving and driven ends of the shaft will be the sum of the reduction in the units B and C.

With three reduction units I am enabled to obtain eight speeds which are progressively arranged and may be obtained by the following operations:

First speed—Units A, B and C are all placed in reduction drive.

Second speed—Units A and B remain in reduction drive while the unit C is placed in direct drive.

Third speed—Unit B is placed in direct drive and the units A and C are placed in reduction drive.

Fourth speed—Units B and C are placed in direct drive and the unit A is placed in reduction drive.

Fifth speed—Units C and B are placed in reduction drive and unit A is placed in direct drive.

Sixth speed—Unit B remains in reduction drive and units A and C are placed in direct drive.

Seventh speed—Unit C is placed in reduction drive and the units A and B are placed in direct drive.

Eighth speed—All of the units A, B, and C are placed in direct drive. The driven end section of the shaft will then be driven at engine speed.

In the description of the various speed changes, it was assumed that the main clutch was engaged with the flywheel of the unit C and the jaw clutch member 62 was in a position connecting the main clutch housing 51 to the driven end section of the shaft through the medium of the internal gear 59 and the planetary gear set E.

As it is not necessary to stop the flow of torque between the driving and driven shafts when changing speed ratios, the main clutch is only placed in neutral or out of engagement with the flywheel on unit C when it is desired to disconnect the motor from the propeller shaft when the engine is running or when the driven end section of the shaft is to be driven in a reverse direction from that of the driving motor through the planetary reverse gear set E.

The changes in speed ratios are accomplished by manipulating the brake band connections between the drums and flywheels of the units A, B, and C through the ring gears 33 and their clamping rings 35. As described the clamping rings are provided with separate actuating means, which in this instance are the control cylinders 36.

The admittance of fluid pressure to the control cylinders mentioned contracts the clamping rings 35 and thereby releases the brake band connections between the drums and flywheels of the units and automatically places the latter in reduction drive. When the pressure in the cylinders is relieved, the clamping rings release from the ring gears 33 and the brake bands 32 automatically connect the drums and flywheels of the reduction units. This places the units in direct drive.

I provide a selective control for the control cylinders. This control is most clearly illustrated in Figs. 8, 9, and 10. The control includes a control valve casing 70 which is formed with a tapered bore within which a control valve member 71 is fitted.

The control valve is formed with circumscribing grooves 73, 74, 75 and 76, which are adapted to register with ports 77, 78 and 79, which are formed in the valve casing 70. The ports 77 and 79 are connected by pipes 81 to a source of fluid under pressure. The ports 78 and 80 are connected to exhaust pipes.

Also formed in the valve casing 70 are three ports 83, 84 and 85, which are connected by pipes 86 to the control cylinders 36 of the reduction units C, B and A, respectively.

Formed in the valve member intermediate the grooves are recesses 87 which are in communication with the grooves so that by turning the valve the ports 83, 84 and 85 may be placed in communication with the grooves to which fluid pressure is admitted or to the grooves connected to the exhaust.

Reference being had to Fig. 10 where the surface of the control valve 71 is developed, it is seen that the recesses 87 between the grooves 73 and 74 alternately connect with the pressure groove 73 and the exhaust groove 74. For the unit C one recess is provided for each speed; that is, in the first speed the port 83 which connects with the control cylinder of the unit C will be placed in communication with the pressure groove 73. In the second speed the port of the control cylinder of the unit C will be placed in communication with the exhaust groove 74. In the remaining speeds, the control cylinder unit C will be alternately placed into communication with the pressure groove and the exhaust groove as described.

The recesses 87 between the exhaust groove 74 and the pressure groove 75 by which the control cylinder of unit B is operated are also alternately connected with the pressure and exhaust grooves mentioned.

For the unit B there is one recess for two speeds. That is, the first recess is connected to the pressure groove 75 and will be in register with the port 84 which is connected with the control cylinder of the unit B when the valve is turned to place the transmission in either first or second speed. The second recess is connected with the exhaust groove 74 and will be in communication with the port 84 when the transmission is in either third or fourth speed. The third and fourth recesses are for operating the control cylinder of unit B when the transmission is in fifth and sixth speeds and in seventh and eighth speeds, and are connected with the pressure and exhaust grooves 75 and 74, respectively.

For controlling the control cylinder of the unit A I form two recesses 87 between the pressure groove 75 and the exhaust groove 76. The first of these recesses connects with the pressure groove and is adapted to register with the port 85 when the valve is turned to place the transmission in first, second, third, or fourth speeds.

The second recess is in communication with the exhaust port 76 and is adapted to be in register with the port 85 of the unit A when the transmission is placed in either 5th, 6th, 7th or 8th speed.

In Fig. 10 the eight positions of the ports in the valve casing with relation to the recesses on the control valve are indicated by dot and dash lines, and for the purpose of explanation in describing the position of the ports in the valve casing which are diagrammed at 88, it will be assumed that this diagram is placed between the dot and dash lines mentioned to indicate the different speeds. It will be seen from this that in the first speed pressure will be admitted to the control cylinders of the units A, B, and C, and therefore, all three of the reduction units will be in reduction drive.

When the valve is turned to obtain a second speed the control cylinder of the unit C will exhaust, but the control cylinder of the units B and A will remain under pressure; thus the reduction unit C will be in direct drive and the reduction units B and A will be in reduction drive.

In third speed the port of the unit C will be in communication with the pressure groove 73 and will be placed in reduction drive. The control cylinder of the unit B will be placed in communication with the exhaust groove 74 and will be automatically placed in direct drive. The unit A will, however, be maintained under pressure to hold it in reduction drive.

It is believed from the foregoing that the control of the control cylinders of the various units is obvious and for clearness I have marked the recesses in the valve surface on Fig. 10 as P and X; P indicating pressure and X exhaust, so that by referring to this figure the spaces between the dotted and dash lines indicating the position of the valve, one may readily ascertain in which drive the various units are operating in the different speeds.

For operating the valve I arrange a vertical shaft 90 which is connected at its lower end to the hub of the valve. It is intended that this vertical shaft be arranged adjacent the steering column of the vehicle in which the transmission is mounted, and that it be fitted with a quadrant lever 91. This quadrant lever is disposed adjacent a quadrant 92 which is notched and numbered at proper points, so that by operating the quadrant lever the valve may be turned a proper amount to place the transmission in either of the eight speeds.

It should be stated that when the transmission is mounted in a vehicle, it may be used as a connecting medium to cause the rear wheels to drive the engine for braking purposes. When the vehicle drives the motor through the transmission the reaction of the compound gears will tend to drive the drum parallel to the flywheel but at a greater rate of speed. I prevent this rotation by means of the clamping ring 35. That is, when changing from direct to reduction drive, the clamping ring is contracted to tightly grip the ring gear to prevent its rotation. Therefore, when the internal brake band 32 is fully released it will serve as a medium through which the ring (held stationary by the clamping ring 35) will prevent rotation of the drum. Circumferential movement of the clamping ring 35 is limited by the engagement of a shoulder $35^a$ thereon with a lug $35^b$ on the control cylinder 36.

While I have shown the preferred form of the invention it will be understood that various changes may be made in the combination, construction and arrangement of parts without departing from the spirit of the invention.

Having thus described my invention, what I claim and desire to secure by Letters Patent is:

1. In a transmission a driving and driven shaft in axial alignment, a drum rotatably mounted on the driving shaft, a pinion fixed on the driving shaft, a gear fixed on the driven shaft, a pair of relatively fixed gears carried by the drum and in constant mesh with said pinion and said gear on the driving and driven shafts, whereby the driving shaft will normally drive the driven shaft through said gears, a fly wheel fixed on said driven shaft and having an axially extending flange, expanding means carried by the drum and capable of operation to frictionally engage the flange and fly wheel to form a direct connection between said drum and said fly wheel whereby they will rotate in unison and form a direct driving connection between said shafts, a member circumferentially movable with relation to the drum, and connecting means between said member and said expanding means operative by the movement of said member for actuating the expanding means.

2. In a transmission a driving and driven shaft in axial alignment, a drum rotatably mounted on the driving shaft, a pinion fixed on the driving shaft, a gear fixed on the driven shaft, a pair of relatively fixed gears carried by the drum and in constant mesh with said pinion and said gear on the driving and driven shafts, whereby the driving shaft will normally drive the driven shaft through said gears, a fly wheel fixed on said driven shaft and having an axially extending flange, expanding means carried by the drum and capable of operation to frictionally engage the flange and fly wheel to form a direct connection between said drum and said fly wheel whereby they will rotate in unison and form a direct driving connection between said shafts, a member circumferentially movable with relation to the drum and normally rotating in unison therewith when the driving shaft is driving the driven shaft through the medium of the gears, operating means connecting said circumferentially moving member to the expanding means, and operated by rotation of the drum relative to the member.

3. In a transmission a driving and driven shaft in axial alignment, a drum rotatably mounted on the driving shaft, a pinion fixed on the driving shaft, a gear fixed on the driven shaft, a pair of relatively fixed gears carried by the drum and in constant mesh with said pinion and said gear on the driving and driven shafts, whereby the driving shaft will normally drive the driven shaft through said gears, a fly wheel fixed on said driven shaft and having an axially extending flange, expanding means carried by the drum and capable of operation to frictionally engage the flange and fly wheel to form a direct connection between said drum and said fly wheel whereby they will rotate in unison and form a direct driving connection between said shafts, a member circumferentially movable with relation to the drum and normally rotating in unison therewith when the driving shaft is driving the driven shaft through the medium of the gears, operating means connecting said circumferentially moving member to the expanding means, and operated by rotation of the drum relative to the member, and control means for controlling the rotation of said circumferentially movable member, to cause relative rotation between the drum and said member, and thereby operate the expanding means.

4. In a transmission, a driving shaft having a bore formed in the end thereof, a driven shaft having a spindle at one end thereof journalled in said bore, a normally stationary drum rotatably mounted on said driving shaft, a pinion fixed on said driving shaft, a gear fixed on the driven shaft, a relatively fixed gear and pinion carried by the drum and in constant engagement with the pinion and the gear on the driving and driven shafts, respectively, whereby the driving shaft will normally drive the driven shaft through the said gears, a flywheel fixed on the driven shaft, a brake band carried by the drum and engageable with a rim on the flywheel and operative to form a connection between said flywheel and said drum whereby the flywheel and the drum will rotate in unison and establish a direct driving connection between said driving and said driven shafts, means for contracting said brake band, said means comprising a ring gear, pinions carried by the drum and in constant engagement with said ring gear, an operative connection between said pinions and said brake band, and means engageable with said ring gear to hold the same from rotation whereby the pinions will be revolved to operate the brake band.

5. In a transmission of the character described, a pair of aligned independent shafts, a pair of casings concentric with said shafts, a pinion fixed on one of said shafts, a gear fixed on the other shaft, a pair of relatively fixed gears carried by one of said casings and in constant mesh with said pinion and said gear on said shafts, the casing carrying said relatively fixed gears being free to rotate about the shafts, the other casing being keyed to one of the shafts, clutch means carried by the free casing and engageable with the keyed casing to connect the casings as a unit and thereby transmit a direct drive between the shafts, a member circumferentially movable with relation to the casings, and means actuated by the movement of said member relative to the casings for operating the clutch means.

6. In a transmission of the character described, a pair of aligned independent shafts, a pair of casings mounted on said shafts, a gear fixed to each shaft, a pair of relatively fixed gears carried by one of said casings and in constant mesh with the gears on said shafts, the casing carrying said relatively fixed gears being free to rotate about the shafts, and the other casing being keyed to one of the shafts, clutching means carried by the free casing and engageable with the keyed casing to directly connect the casings and thereby transmit a direct drive between the shafts, a member circumferentially movable with relation to the casings, operative means for transmitting said movement in one direction, means actuated thereby for releasing the clutching means, and other means for automatically reversing the movement to apply the clutching means.

7. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being connected to one of the shafts, friction means carried by the free casing and engageable with the keyed casing to lock the casings as a unit to transmit a direct drive between the shafts, a member circumferentially movable with relation to the casings, manually actuated means for transmitting said circumferential movement, and means actuated thereby for releasing the friction means, said manually actuated means also securing the free casing against rotation with the aligned shafts when the friction means is released.

8. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being connected to one of the shafts, friction means carried by the free casing and engageable with the keyed casing to lock the casings as a unit to transmit a direct drive between the shafts, a ring concentric with the casings, a brake member engageable with said ring, manually actuated means for tightening said brake member and for imparting a circumferential movement to the ring, means actuated by said circumferential movement for releasing the friction means, and other means for applying the friction means when the brake member is released.

9. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being connected to one of the shafts, friction means carried by the free casing and engageable with the keyed casing to lock the casings as a unit to transmit a direct drive between the casings, a ring concentric with the casings, a brake member engageable with said ring, said brake member also adapted to secure the free casing against rotation with the shafts, means actuated by circumferential movement of the ring for releasing the friction means between the free casing, and the keyed casing, and other means for automatically applying the friction means to lock the casings as a unit when the brake member is released.

10. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being keyed to one of the shafts, friction means carried by the free casing and engageable with the keyed casing to lock the casings as a unit to transmit a direct drive between the shafts, a ring concentric with the casings, manually actuated means for imparting a partial circumferential movement to the ring in one direction, means for automatically reversing the movement of the ring when said manually actuated means is released, and means actuated by the movement of the ring for applying and releasing the friction means.

11. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being keyed to one of the shafts, friction means carried by the free casing and engageable with the keyed casing to lock the casings as a unit to transmit a direct drive between the shafts, a ring carried by the free casing and normally rotatable in unison with the same, a brake band surrounding the ring, manually actuated means for tightening the brake band and for imparting a partial rotation to the ring in one direction, means on the free casing for limiting said movement, said means preventing rotation of the free casing with the keyed casing when the friction means is released, other means for imparting circumferential movement to the ring when the brake band is released, means actuated by the movement of the ring in one direction for releasing the friction means, said means applying the friction means when the ring is moved in the opposite direction, and means for locking the free casing against counter-rotation when the friction means is released.

12. In a transmission of the character described, a pair of aligned independent shafts, a pair of casing concentric with said shafts, a gear fixed on each shaft, a pair of relatively fixed gears carried by one of said casings and in constant mesh with the gears on said shafts, the casing carrying said gears being free to rotate about the shafts and the other being keyed to one of the shafts, friction means carried by the free casing and engageable with the keyed casing to lock the casings as a unit to transmit a direct drive between the shafts, a ring carried by the free casing and normally rotatable in unison with the same, a brake band surrounding the ring, manually actuated means for tightening the brake band and for imparting a partial rotation to the ring in one direction, means on the free casing for limiting said movement, said means preventing rotation of the free casing with the keyed casing when the friction means is released, other means for imparting circumferential movement to the ring when the brake band is released, means actuated by the movement of the ring in one direction for releasing the friction means, said means applying the friction means when the ring is moved in the opposite direction, and a pair of friction shoes engageable with the free casing and adapted to automatically engage and grip the same against rotation in one direction.

13. In a transmission of the character described, a pair of aligned independent shafts, a pair of casings concentric with said shafts, a pinion fixed on one of said shafts, a gear fixed on the other shaft, a pair of relatively fixed gears carried by one of said casings and in constant mesh with said pinion and said gear on said shafts, the casing carrying said relatively fixed gears being free to rotate about the shafts, the other casing being keyed to one of the shafts, clutch means carried by the free casing and engageable with the keyed casing to connect the casings as a unit and thereby transmit a direct drive between the shafts, a member circumferentially movable with relation to the casings, means actuated by the movement of said member relative to the casings for operating the clutch means, and means for automatically locking the free casing against counter-rotation caused by gear reaction when the keyed casing is released.

14. In a transmission of the character described, a pair of aligned independent shafts, a pair of casings concentric with said shafts, a gear fixed on each shaft, a pair of relatively fixed gears carried by one of said casings and in constant mesh with the gears on said shafts, the casing carrying said gears being free to rotate about the shafts and the other being connected to one of the shafts, friction means carried by the free casing and engageable with the keyed casing to lock the casings as a unit to transmit a direct drive between the shafts, a member circumferentially movable with relation to the casings, manually actuated means for transmitting said circumferential movement, means actuated thereby for releasing the friction means, said manually actuated means also securing the free casing against rotation with the aligned shafts when the friction means is released, and means for automatically locking the free casing against counter-rotation caused by gear reaction when the keyed casing is released.

JOHN PATTERSON.